March 19, 1957     C. ROSSI     2,785,564
TRAILER HITCH LOCK
Filed Sept. 20, 1955
FIG. 1.
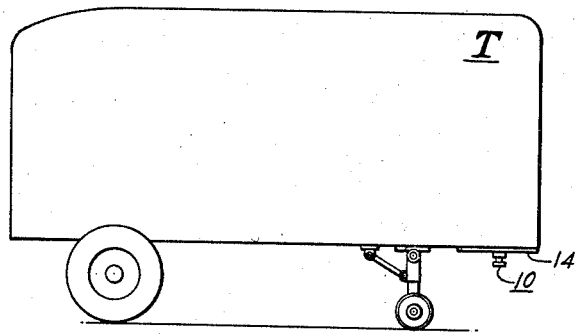
FIG. 2.
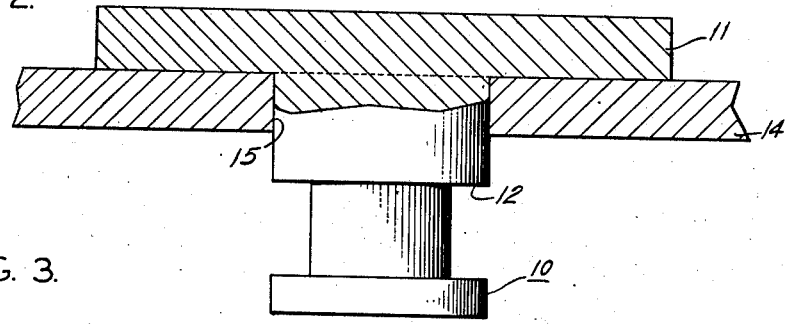
FIG. 3.
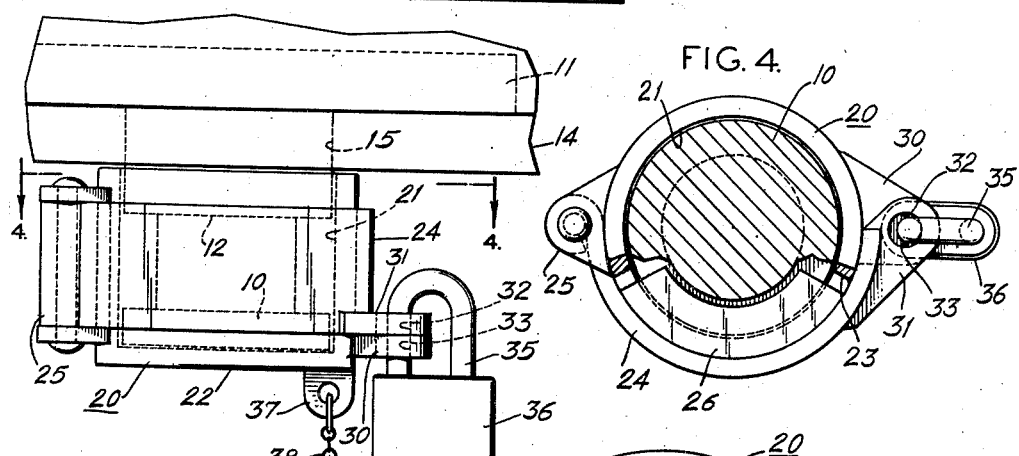
FIG. 4.
FIG. 5.
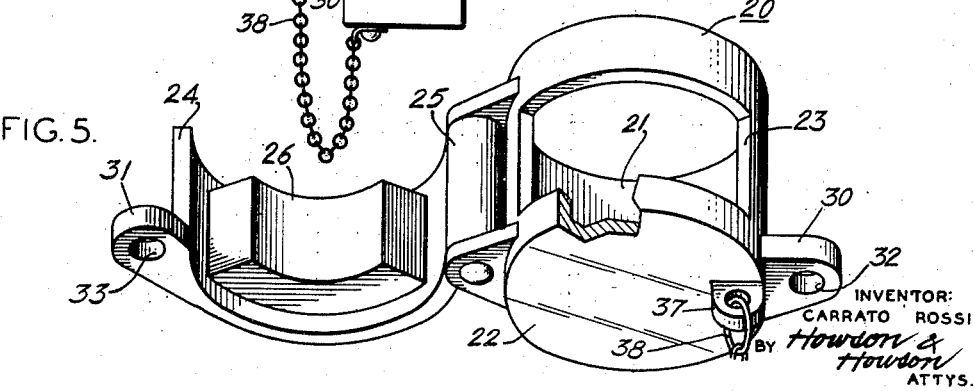
INVENTOR:
CARRATO ROSSI
BY Howson & Howson
ATTYS.

United States Patent Office 2,785,564
Patented Mar. 19, 1957

2,785,564

TRAILER HITCH LOCK

Carrato Rossi, Philadelphia, Pa.

Application September 20, 1955, Serial No. 535,480

4 Claims. (Cl. 70—232)

The present invention relates to trailer hitches of semi-trailers of the type hauled by tractors, and more particularly to a lock for application to the hitch pin to prevent unauthorized or inadvertent engagement of the hitch pin by the fifth wheel of a tractor.

In freight distribution centers, it is a common practice to park a substantial number of semi-trailers at a loading platform. Atfer the trailers are loaded, the tractors are engaged with the respective trailers for hauling to their destination. I sometimes happens that the driver of a tractor fails to properly identify the trailer, and as a result, picks up the wrong trailer and hauls it to the wrong destination. A great deal of time and money is spent in locating the misplaced trailer and correcting the error. It also sometimes occurs that an unauthorized person having a standard tractor, picks up a trailer and hauls it away.

The present invention eliminates these drawbacks occasioned by the uniform construction of the trailer hitching pin and the tractor fifth wheels by providing a lock for the hitch pin which effectively prevents engagement of the fifth wheel with the hitch pin by unauthorized or mistaken tractor operators. When the trailer is parked, the hitching pin is locked, and thereafter only the tractor driver having the proper key, can pick up the trailer without breaking the lock.

With the foregoing in mind, a primary object of the present invention is to provide a novel locking member for the hitch pin of a semi-trailer.

More specifically, the invention contemplates a cylindrical casing which telescopically engages the hitch pin, bridging the groove of the hitch pin in which the fifth wheel of the tractor engages, and a latch for normally retaining the casing engaged on the pin.

The invention further contemplates a locking device for the hitch pin which is of simple construction, and yet is fully effective in operation and use.

All of the objects of the invention, and the various features and details of the construction and operation thereof are more fully set forth hereinafter with reference to the accompanying drawing in which:

Fig. 1 is a side elevation of a semi-trailer embodying the present invention;

Fig. 2 is an enlarged sectional view partially in elevation showing the hitch pin of the trailer;

Fig. 3 is an enlarged elevational view showing the locking member in place on the hitch pin;

Fig. 4 is a sectional view taken on the line 4—4 of Fig. 3; and,

Fig. 5 is a perspective view of the locking device detached from the hitch pin.

Referring to the drawing, Fig. 1 shows a trailer T having mounted thereon a hitch pin 10. As shown in Fig. 2, the hitch pin 10 is formed integrally with a bed plate 11 which is adapted to be secured to the trailer body T. The pin is a generally cylindrical member having a straight-walled groove 12 therein. A scuff plate 14 of substantial length and width and having a central aperture 15 therein, is mounted over the hitch pin 10 and secured to the trailer body T. This is conventional construction, and in the operation of the trailer, the fifth wheel of the tractor is backed under the scuff plate 14, raising it to enable elongated aperture in the fifth wheel to engage in the groove 12. When the pin is bottomed in the aperture of the fifth wheel, a latch is operated to lock the pin in place. The tractor is therefore firmly engaged with the trailer T for hauling the latter.

In accordance with the invention, a locking device is provided for the hitch pin to bridge the circumferential groove 12 and preclude engagement of the fifth wheel of the tractor with the hitch pin. The locking device comprises a cup-like member 20 having a cylindrical bore 21 terminating in the present instance in an end plate 22. The cup 20 telescopically engages over the hinge pin 10, and means is provided to secure the cup 20 in place. To this end, a portion of the wall of the cup 20 is cut out as indicated at 23 and a cover plate 24 is hingedly secured to the cup as indicated at 25 to overlie the opening 23 in the closed position of the cover plate. The cover plate 24 is provided with an inwardly projecting boss 26 which passes through the opening 23 and is of sufficient thickness to engage in the straight-walled groove 12 of the hitch pin 10.

In accordance with the invention, means is provided to releasably lock the cover plate 24 closed, to thereby secure the cup 20 on the hitch pin 10 against unauthorized or inadvertent removal. In the present instance, the locking means comprises an ear 30 on the body of the member 20 and an ear 31 on the cover plate 24. When the cover plate is in closed position, the ears 30 and 31 are disposed in overlying relationship, each ear being provided with an aperture 32 and 33 respectively. The apertures 32 and 33 register to afford passage of the shackle 35 of a conventional padlock 36 therethrough. In the present instance, the padlock 36 is connected to the cup 20 by means of an aperatured lug 37 and a flexible ligament 38, for example, a chain or the like.

Thus, the present invention provides a cup-like member for engaging over the hitch pin of a trailer, bridging the groove therein and effectively preventing unauthorized or inadvertent engagement of a tractor with the trailer.

While a particular form of the invention has been herein illustrated and described, it is not intended to limit the invention to such a disclosure, but changes and modifications may be made therein and thereto within the scope of the following claims.

What is claimed is:

1. For the hitch pin of a trailer having a circumferential groove therein for engagement with the fifth wheel of a tractor, a locking device comprising a body member having a cylindrical bore adapted to telescopically engage over said hitch pin, means defining an opening in the side wall of said member to expose the circumferential groove of the hitch pin, a cover plate hinged to the body member and adapted in the closed position to overlie said opening, an interiorly projecting boss on said cover plate adapted to pass through said opening in the body member and engage in the circumferential groove of said hitch pin, and latching means to lock said cover plate in closed position comprising apertured ears on said body member and said cover plate respectively adapted in the closed position of the cover plate to overlie one another with the apertures in registry, and lock means having a shackle adapted to be received in said registering apertures.

2. For the hitch pin of a trailer having a circumferential groove therein for engagement with the fifth wheel of a tractor, a locking device comprising a cup-like body member having a cylindrical bore adapted to telescopically engage over said hitch pin and terminating in an end plate closing one end of said bore, means defining an opening in the side wall of said body member to expose the circumferential groove of the hitch pin, a cover plate hinged to the body member and adapted in the closed position to overlie said opening, an interiorly projecting boss on said cover plate adapted to pass through said opening in the body member and engage in the circumferential groove of said hitch pin, and latching means to lock said cover plate in closed position.

3. For the hitch pin of a trailer having a circumferential groove therein for engagement with the fifth wheel of a tractor, a locking device comprising a cup-like body member having a cylindrical bore adapted to telescopically engage over said hitch pin and terminating in an end plate, closing one end of said bore, means defining an opening in the side wall of said body member to expose the circumferential groove of the hitch pin, a cover plate hinged to the body member and adapted in the closed position to overlie said opening, an interiorly projecting boss on said cover plate adapted to pass through said opening in the body member and engage in the circumferential groove of said hitch pin, and latching means to lock said cover plate in closed position comprising apertured ears on said body member and said cover plate respectively adapted in the closed position of the cover plate to overlie one another with the apertures in registry, and lock means having a shackle adapted to be received in said registering apertures.

4. For the hitch pin of a trailer having a circumferential groove therein for engagement with the fifth wheel of a tractor, a locking device comprising a cup-like body member having a cylindrical bore adapted to telescopically engage over said hitch pin and terminating in an end plate, closing one end of said bore, means defining an opening in the side wall of said body member to expose the circumferential groove of the hitch pin, a cover plate hinged to the body member and adapted in the closed position to overlie said opening, and an interiorly projecting boss on said cover plate adapted to pass through said opening in the cup member and engage in the circumferential groove of said hitch pin, and latching means to lock said cover plate in closed position comprising apertured ears on said body member and said cover plate respectively adapted in the closed position of the cover plate to overlie one another with the apertures in registry, lock means having a shackle adapted to be received in said registering apertures, an apertured lug on said end plate of the cup member, and a flexible ligament secured to said lug at one end, and to said lock means at the other end to thereby retain said lock means connected to said cup member upon disengagement of the shackle from said apertured ears.

References Cited in the file of this patent
UNITED STATES PATENTS

| | | |
|---|---|---|
| 1,422,372 | Pardee | July 11, 1922 |
| 2,440,744 | Grinnell | May 4, 1948 |
| 2,469,973 | Malluk | May 10, 1949 |
| 2,641,124 | Gallagher | June 9, 1953 |
| 2,706,392 | Lucas | Apr. 19, 1955 |